United States Patent [19]
Smith et al.

[11] Patent Number: 5,359,697
[45] Date of Patent: Oct. 25, 1994

[54] FUZZY ASSOCIATIVE MEMORY

[75] Inventors: Jack L. Smith, San Diego; Robert Hecht-Nielsen, Del Mar, both of Calif.

[73] Assignee: TRW Inc., Redondo Beach, Calif.

[21] Appl. No.: 715,429

[22] Filed: Mar. 25, 1985

[51] Int. Cl.⁵ .............................................. G06F 15/18
[52] U.S. Cl. ........................................ 395/3; 395/900
[58] Field of Search .................... 364/554, 200, 900

[56] References Cited

U.S. PATENT DOCUMENTS

| | | | |
|---|---|---|---|
| 3,931,612 | 1/1976 | Stevens et al. | 340/172.5 |
| 4,473,081 | 9/1984 | Dioguardi et al. | 128/670 |
| 4,875,184 | 10/1989 | Yamakawa | 395/3 |
| 5,249,257 | 9/1993 | Akahori et al. | 395/3 |
| 5,249,269 | 9/1993 | Nakao et al. | 395/900 |
| 5,262,833 | 11/1993 | Fukushima et al. | 395/900 |

*Primary Examiner*—Salvatore Cangialosi

[57] ABSTRACT

A "fuzzy" associative memory system, and a related method for its use, the system having a large data vector memory for the storage of a large number of vectors having multiple data fields, to be compared with a number of comparison windows defined by upper and lower limits for each data field of the vectors. Output results in the form of match indications are accumulated in an output buffer for output to a host computer, which also initiates the searches. The large data vector memory facilitates window searching and searching for the closest neighbors to a given vector. It also provides a technique for searching large numbers of windows, and for classifying unknown patterns even when pattern classes are irregular in shape.

26 Claims, 7 Drawing Sheets

|  | WINDOW 1 | | | | |
|---|---|---|---|---|---|
| "TIGHTEST" | | 3200 | 13030 | 90 | 14 |
| | | 3200 | 12030 | 90 | 18 |
| WINDOW 2 | | 3202 | 13180 | 96 | 14 |
| | | 3186 | 12900 | 86 | 10 |
| WINDOW 3 | | 3200 | 13030 | 90 | 14 |
| | | 3186 | 12830 | 46 | 8 |
| WINDOW N | | | | | |
| "LOOSET" | | 3230 | 13200 | 180 | 20 |
| | | 3180 | 12800 | 8 | 8 |
| NEW OBSERVATION X= | | 3200 | 13000 | 90 | 12 |

FIELD TUBE IGNORED

FUZZY ASSOCIATIVE MEMORY

CROSS-REFERENCE TO RELATED APPLICATION

This application is related to the subject matter of a pending application by Barry H. Whalen et al. entitled "Window-Addressable Memory Circuit," filed on Jul. 21, 1983, now issued as U.S. Pat. No. 4,627,024 given Ser. No. 517,083, and owned by the same entity as this application. The disclosure of the copending application is hereby incorporated by reference into this specification.

BACKGROUND OF THE INVENTION

1. Field of the Invention:

This invention relates generally to memory circuits and, more particularly, to special-purpose memory circuits used in digital signal processing. There is a general class of computational search problems in which numerical data must be sorted or classified in accordance with its relationship to one or more sets of dimensional limits. It is with this class of problems that the present invention is concerned.

For example, in the processing of census data it may be useful to determine the number of people within specified age limits living within a specified geographical area, defined by a numerical range of ZIP codes. Clearly, such a problem is easily handled by a programmable general-purpose digital computer. In some cases, the speed of operation of the computer is of no concern, since there is typically no need for an immediate solution to the problem. However, there are some problems in the same general class that must be solved more rapidly. In some cases, the solution is required in "real time," or almost instantly as a data stream is received and processed. A programmed digital computer may still be fast enough to satisfy the requirements of some of these applications. For others, however, even the fastest programmable computers cannot provide real-time solutions to the complex signal processing problems that are involved.

One area in which real-time solutions are typically required is the field of pattern recognition and image processing. For example, the processing of photographic data from an earth-orbiting satellite may require that areas having a particular color and a particular shape be identified and counted. Another form of pattern recognition is the identification of the source of a spoken word by its spectral content, or the identification of a signal source by its spectral content. Pattern recognition has many other well known applications in both military and commercial areas.

Another important example of the type of signal processing with which the invention is concerned is the processing of radar pulses. The analysis of radar pulses from multiple sources is frequently too complex for human operators to be able to handle rapidly and reliably. In a typical system, each received radar signal is preprocessed into digital fields that characterize and completely define the signal. The fields might contain such information as time of arrival, frequency, pulse amplitude, pulse width, angle of arrival, and so forth. In a typical application, there may be many such signals whose sources are known and are of no consequence to the signal processing. Since the characteristics of these signals from known sources are also known, a first processing step is usually to filter out these known signals from ones of more particular interest. This filtering step is analogous to finding the number of people in a selected age group in particular region of the country, but in the radar example the specified items are discarded as uninteresting rather than further analyzed. Both applications, however, are examples of a process that might be described as environmental filtering.

The cross-referenced application, which is not believed to be prior art with respect to the invention claimed in this application, discloses a window-addressable memory in which input words having multiple data fields can be compared with up to eight sets of upper and lower "window" limits for the data fields, and match indicators are generated if all data fields in the input word fall within the upper and lower window limits stored in the circuit. The input words may be thought of as vectors in an n-dimensional space, where n is the number of data fields in the input word. The window-addressable memory (WAM) circuit permits the comparison of an input vector with up to eight sets of dimensional limits. If an application requires a comparison with a greater number of windows, multiple WAMs can be cascaded, but there is a practical limit imposed by the relatively high cost of the WAM circuits.

2. Prior Art:

One approach taken in the prior art has been to provide more comparison registers, containing upper and lower bounds, on a single processing chip. For example, in a paper by Craig A. Hanna entitled "The Associative Comparator: Adds New Capabilities to ESM Signal Processing," Defense Electronics, February, 1984, pp. 51-62, the author describes a comparison chip with thirty-two comparison registers, and suggests a future design with 512 comparison registers. Such designs are, of course, complex and correspondingly costly to implement. Moreover, even with the availability of circuits with hundreds of comparison registers, or windows, there are still some applications that require comparisons between an input data vector and a very large number of windows.

Hashing techniques have been employed to reduce the processing requirements for searching. This is basically a software solution in which data fields are transformed into a different arrangement, which is more compact and easier to manipulate. Hashing, or hash coding, has been usefully employed in one- and two-dimensional searches. However, the complexity and routing of hashing approaches becomes questionable as the number of dimensions increases, making file updating unmanageable for real-time implementation. Also, if the data to be searched through is rapidly changing in either content or amount, hashing is difficult to apply. More importantly, implementation of windowed or "fuzzy" comparisons are difficult if hashing techniques are used. Examples of hashing techniques may be found in D. E. Knuth, "The Art of Computer Programming," Vol. 3: Sorting and Searching, Addison Wesley, Reading, Mass., 1973, and in C. J. Date, "An Introduction to Database Systems," Addison Wesley, Reading, Mass., 2nd Ed., 1977.

Fully parallel content addressable memories compare the full width of a relatively large number of object data words, stored in a memory, in parallel against a search vector. This results in extremely fast searches and flexibility to handle complex searches. However, fully parallel content addressable memories are complex and relatively costly. Holographic memories are of this type, and are complex and difficult to update. See, for example, T. Kohonen, "Content-Addressable Memories," Springer-Verlag, New York, N.Y., 1980.

Bit-serial or byte serial memory circuits make comparisons with object data words stored in a memory by accessing multiple words in parallel, but only one bit or byte at a time for the multiple words accessed. This was the approach adopted for the Goodyear STARAN processors described in the following four papers:

K. E. Batcher, "Bit Serial Parallel Processing Systems," IEEE Trans. Computers, Vol. C-31, pp. 377-84, May, 1982;

K. E. Batcher, "The Multidimensional Access Memory in STARAN," IEEE Trans. Computers, Vol. C-26, pp. 174-77, February, 1977;

K. E. Batcher, "STRAN Series E," 1977 Int'l Conf. Parallel Processing, pp. 144-53, August, 1977; and E. W. Davis, "STARAN Parallel Processor System Software," Proc. of 1974 Nat. Comp. Conf., AFIPS Conf. Proc., Vol. 43, p. 17.

The bit-serial or byte-serial mechanism potentially supports very long data words, with some flexibility in format. The hardware for windowing operations is relatively complex, and the memory architecture requires accessing both in parallel, for up to a limited number of words, and serially, for a larger number of words. Also, direct addressing of the memory is difficult, as is incorporating such a circuit into a practical system.

Finally, bit-parallel content addressable memories perform an association over an entire object data word at a time, with fully parallel hardware comparisons over the entire word. With the exception of the system described in the Hanna paper discussed above, prior circuits of this type did not support n-dimensional vectors and did not have the ability to perform fuzzy comparisons.

It will be appreciated from the foregoing that there is still a need for improvement in the field of window-addressable or "fuzzy" associative memories. In particular, what is needed is a memory system of this type that is simple and convenient to use, and is capable of handling many more windows than can presently be handled, but without excessive complexity or cost. The present invention is directed to this end.

SUMMARY OF THE INVENTION

The present invention resides in a fuzzy associative memory system in which a large data vector memory is employed to provide some of the features lacking in memories of the prior art, but without excessive cost or complexity. Briefly, and in general terms, the memory system of the invention comprises a data vector memory for holding a relatively large number of n-dimensional data vectors, and window-addressable comparison means, for comparing input vectors with pre-stored sets of upper and lower limits, and generating match results from the comparisons. The memory system also includes an output buffer, in which match results and corresponding matched data vectors are combined for output, input/output means, for accessing the data vector memory, the comparison means and the output buffer, and control means, for directing operations of the window-addressable comparison means, to effect processing of a selected set of data vectors stored in the data vector memory.

In the preferred embodiment of the invention, the input/output means includes a memory update port for access to the data vector memory, and a search port for access to the comparison means and to the output buffer. This permits loading and updating of the data vector memory to be under the control of a separate computer from one used to direct search operations. The output buffer in the preferred embodiment of the invention is segmented into two portions, to permit unloading of results from one portion while results of a subsequent search are being stored in the other portion.

The presently preferred embodiment of the invention also includes an input buffer, through which search window parameters are input to the comparison means. The input buffer may be loaded while a prior search is still in progress.

The data vector memory may be used to store blocks of data vectors relating to different applications and having different formats of data fields. When initiating a search, two alternative approaches are available. One is to provide an absolute starting address, for use in accessing the data vector memory. The other option is to employ a hash memory table, by means of which the data vector memory is divided into logical blocks, which are then addressable by a block identifier. In the latter case, the starting address are derived from the hash memory table.

The system provides three options for termination of a search. The first is based on a count of data vectors to be searched, supplied through the search port. The second is based on a count of matched vectors identified, this count also being supplied through the search bus. Finally, termination can be effected by detection of a unique termination code in a data vector. This requires one of the match windows to be selected and conditioned to find an exact match for the termination code.

This hardware arrangement of the invention is adaptable to a wide variety of search formats and types. Moreover, as will be appreciated from the description of some of the specific methods of using the system, the data vector memory enables the performance of powerful searching operations that are not possible in associative memories of the prior art.

The basic searching method of the invention is intended to perform selectably fuzzy comparisons between a selected block of data vectors in a data vector memory and a set of comparison windows having upper and lower limits stored in a comparison processor. The method comprises the steps of preliminarily storing a plurality of pairs of upper and lower limits of comparison windows in the comparison processor, and preliminarily storing a set of data vectors in a data vector memory. Both the data vectors and the comparison windows have n data fields of predefined lengths and meanings. The next steps in the method are selecting a set of vectors for comparison from the data vector memory, comparing each selected data vector with each pair of upper and lower limits, generating a match condition only when all selected ones of the n data fields within the data vector fall within the upper and lower limits of any of the comparison vectors, and generating from the match condition a set of result words, each indicative of the comparison vector that produced the match and the data vector that produced the match. Preferably, the step of generating result words provides both the data vector that produced the match and its address in the data vector memory.

One specific aspect of the invention is applicable to situations in which the search must determine which ones of a large number of comparison windows encompass a given data vector of interest. The step of preliminarily storing data vectors is used to store the centroids of a large number of comparison windows. That is to say, the high and low bounds are not stored, but the average value of the high and low bounds, for each data field. The stored centroid for each window represents the center of "volume" of the n-dimensional region defined by the window. In a sense, the centroid represents the window in a compressed form; it represents the location but not the size of the window. In this approach, then, the data vector memory is used to store a large number of windows, but not the absolute limits of the windows. The step of preliminarily storing pairs of upper and lower limits is used to store a set of graduated upper and lower limits that define regions of varying proximity to the given data vector of interest. In effect, the upper and lower limits stored in the comparison processor define a set of nested n-dimensional "boxes" surrounding a point representative of the vector of interest. In the step of comparing, the centroids of the many windows are compared with the data vector of interest, and a small number of the windows are identified as the ones closest to the data vector of interest. An additional step is needed to determine which of the identified smaller number of comparison windows encompasses the data vector of interest. This step may be executed in an external host computer, where such a comparison for a small number of windows may be performed relatively quickly, and probably more quickly than if the fuzzy addressable memory system were to be reloaded to perform the same function.

Another important application of the method of the invention is in the field of pattern recognition. A general pattern recognition problem is to determine whether an n-dimensional vector falls within one or more n-dimensional regions. The regions are typically irregular in shape, and may be interwoven and partially overlapping. In accordance with this aspect of the invention, each irregular region is approximately defined by a selected combination of regular n-dimensional figures of various sizes and shapes. In the two-dimensional case, it is easy to conceive that these regular figures are rectangles of various sizes and shapes. Each irregular region, or area if two dimensional, is defined as a plurality of rectangles, or "building blocks," placed in selected centroid positions. The data vector memory of the system is used to store definitions of the irregular regions. Each data vector will therefore contain data fields indicative of a selected centroid position. The vector will also contain a data field indicating the building block type, which uniquely identifies its size and shape and another data field identifying the irregular region to which the block is assigned. In this way, irregular regions may be defined with a fair degree of accuracy, using a very large number of building blocks having a relatively small number of types.

In accordance with the method, the comparison processor memory is used to store the upper and lower limits of each of the building block types, these upper and lower limits being centered on a point that represents a data vector of interest. When a comparison is made between the vectors in data vector memory and the comparison vectors in the comparison processor, the match results will indicate whenever a centroid of a component block of a region is close to the vector of interest. That is to say, a match indicates that a centroid of a component building block falls within the window defined by that building block when centered on the point of interest. When this occurs, it follows from a duality relationship between the centroid and the point of interest that the point of interest would fall within the building block window if it were centered on the centroid point.

This technique is an extremely powerful one, since it permits irregular regions in n-dimensional space to be defined to a close degree of approximation as a very large number of easily defined regular regions. It can then be simply determined into which irregular region, or regions, that a vector of interest falls.

It will be appreciated from the foregoing that the present invention represents a significant advance in the field of digital signal processing. In particular, the invention provides an extremely powerful and conveniently used associative searching tool, which can be easily adapted to perform simple windowed searches, k-closest-neighbor searches, and searches involving very large numbers of windows. In addition, the system can be used without modification to perform a pattern recognition function involving classification of unknown vectors into classes defined by irregular and possibly overlapping and interwoven n-dimensional regions. Other aspects and advantages of the invention will become apparent from the following more detailed description, taken in conjunction with the accompanying drawings.

DESCRIPTION OF THE PREFERRED EMBODIMENT

Figure 1:
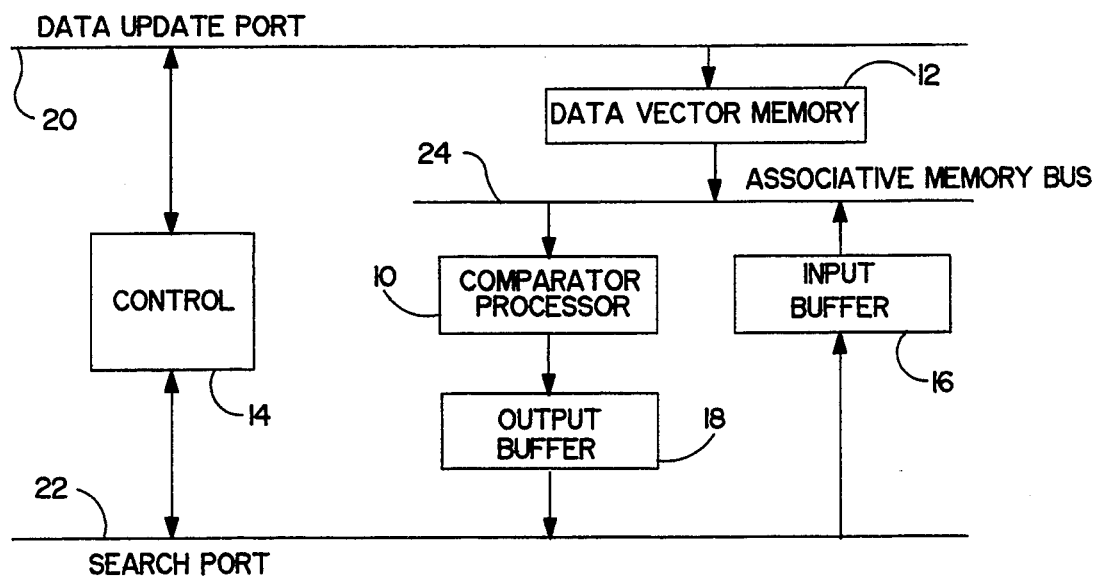
FIG. 1 is a simplified block diagram of the fuzzy associative memory (FAM) system of the invention.

Overview:

As shown in the drawings for purposes of illustration, the present invention is concerned with content-addressable or associative memories. In the past, there has been no way to conveniently perform complex associative searches on large numbers of data vectors. In accordance with the invention, a fuzzy associative memory system includes a large data vector memory, which not only renders the system more convenient to use, but provides search functions not previously possible with other more limited types of associative memories.

FIG. 1 shows the invention in simplified block diagram form. The basic components are a comparator processor, indicated by reference numeral 10, a data vector memory 12, control logic 14, an input buffer 16 and an output buffer 18. The data vector memory 12 receives data through a data update port 20, and a separate search port 22 is employed to load search parameters into the input buffer 16, and to unload search results from the output buffer 18. The comparator processor 10, the data vector memory 12 and the input buffer 16 are all connected to an associative memory bus 24.

To set up the system for a search, various search parameters are loaded into the comparator processor 10 through the search port 22, the input buffer 16, and the associative memory bus 24. The data vector memory is loaded or updated through the data update port 20. As will be explained in more detail, the comparator processor 10 functions as a data filter. A stream of data vectors passes through the processor 10 from the data vector memory 12, and each incoming vector is compared with each of a plurality of comparison windows stored in the processor. The comparison windows take the form of upper and lower bounds or limits for each of a number of predefined data fields within each vector. The comparator processor 10 generates match conditions whenever an incoming data vector falls within the upper and lower limits for every selected data field within the vector. The output buffer 18 accumulates the search results for output through the search port 22.

Figure 2:
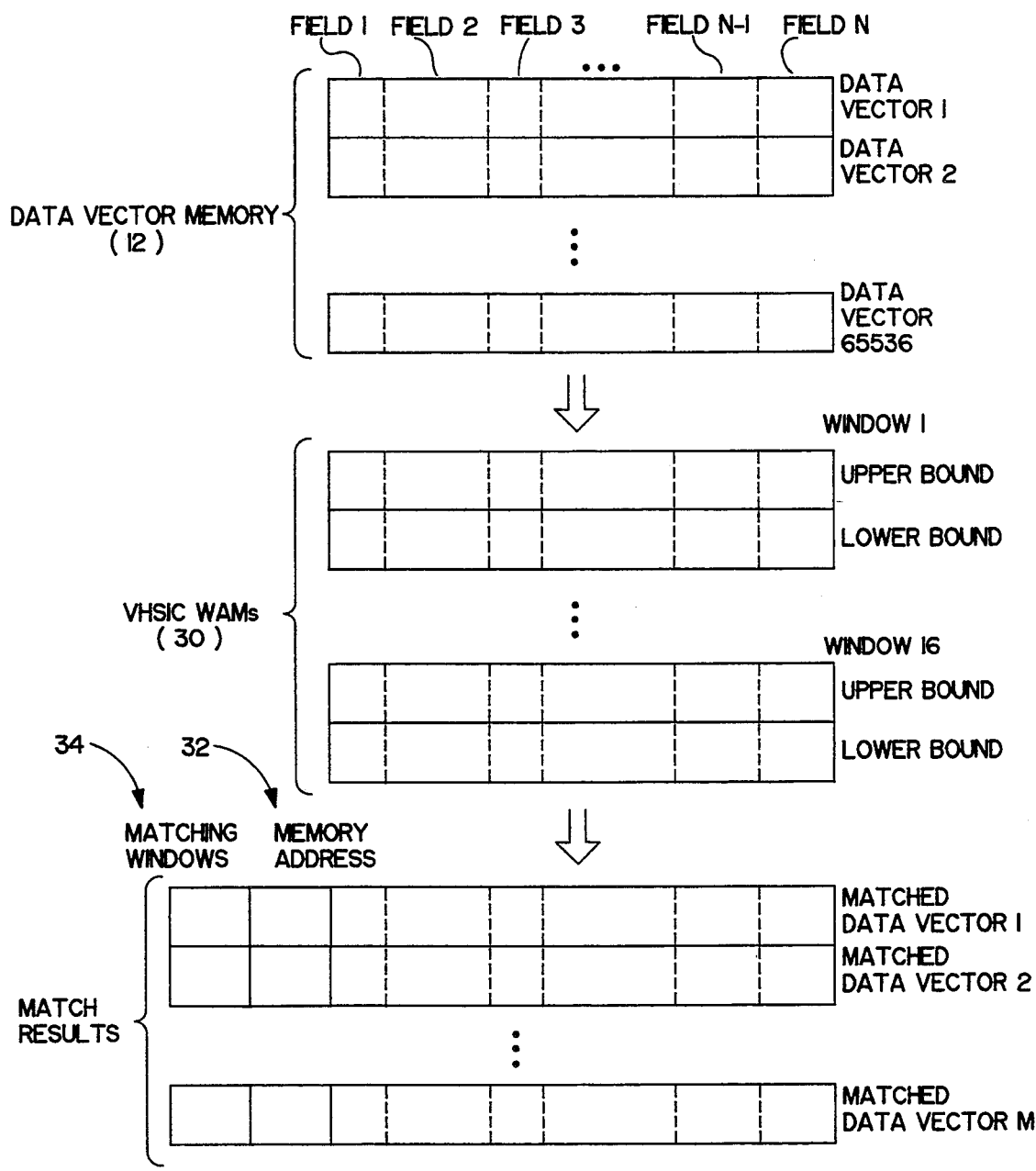
FIG. 2 is a diagram showing how data vectors are processed in the FAM of FIG. 1.

The data vector memory 12 is shown in FIG. 2 as comprising a plurality of relatively wide memory words for storing data vectors. In the illustrative embodiment of the invention, the data vector memory is consists of 64k (65,536) words of 96 bits each. Each memory word is divisible into n data fields of selected lengths, but the hardware used necessarily imposes some limitations on the designation of data fields. In the present implementation, the data fields have to be multiples of four bits wide, and there has to be a data field boundary between the 48th and 49th bits in the word. Accordingly n may be as high as twenty-four if four-bit data fields are used.

The comparator processor 10 includes internal storage for a plurality of 96-bit pairs of upper and lower bounds, as indicated at 30 in FIG. 2. These define a plurality of comparison windows, up to sixteen in the illustrative system, having the same data field definitions as the data vectors to be retrieved from the data vector memory 12. When a data vector from the memory 12 is input to the processor 10, it is compared simultaneously with each of the sixteen pairs of upper and lower bounds. A match is indicated only if every data field of incoming vector falls within a pair of upper and lower bounds of a comparison window. As will be further discussed, selected data fields may be deliberately ignored in the comparison operation. What emerges from the processor 10 and is gated into the output buffer 18 is a filtered set of data vectors that satisfied the match conditions. For each match of a data vector, the match result word includes the original data vector, an additional field 32 containing the address of the data vector in the data vector memory 12, and another additional field 34 containing a bit-map indication of which one or ones of the sixteen windows produced a match.

It will be understood from this description that the term "fuzzy" associative memory refers to a type of content-addressable memory in which the data fields of a data vector may be matched, but not necessarily exactly, with one or more vectors defined by comparison windows. Of course, optional exact matching is made possible by setting the upper and lower bounds of a comparison window to be identical. The comparator processor 10 is also capable of selectively ignoring data fields during the comparison process. A mask register is employed for this purpose, as fully described in the cross-referenced application.

The comparator processor 10 in the presently preferred embodiment of the invention includes four of the window-addressable memory (WAM) circuits described in the cross-referenced application. Each WAM circuit has storage for eight pairs of upper and lower comparison limits, and has a width of 48 bits. The four circuits are connected in a 2×2 configuration to provide sixteen pairs of upper and lower limits with a width of 96 bits.

Figure 10A:
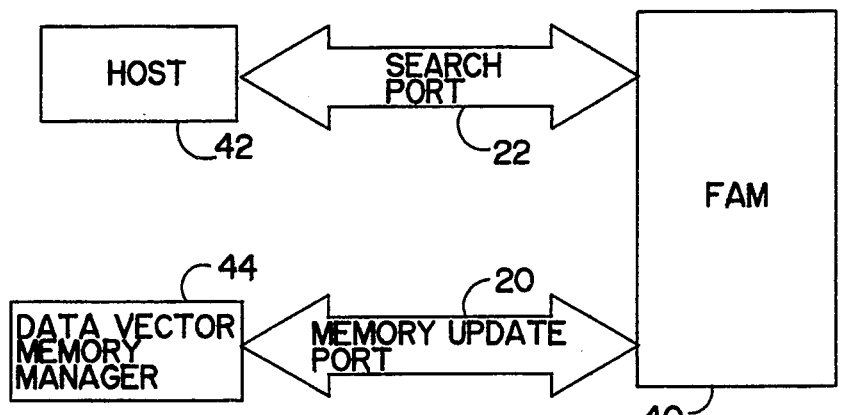
FIGS. 10a and 10b are block diagrams showing two possible configurations of a computer environment for the FAM system.
Figure 10B:
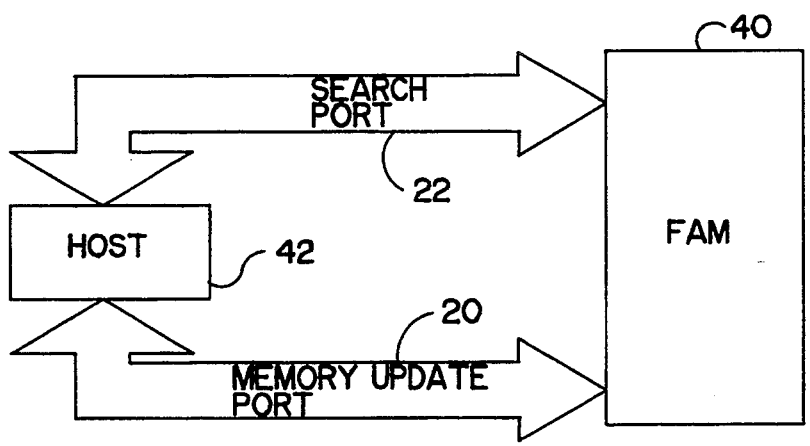

External Environment for the FAM:

As shown in FIGS. 10a and 10b, the FAM system, indicated at 40, may be connected two ways to external computing resources in two alternative configurations. In the preferred approach shown in FIG. 10a, a host computer 42 is connected to the search port 22 to control searches performed by the FAM 40. The host computer 42 is the source of the upper and lower limit data supplied to the comparator processor 10 in the FAM, and also receives results from the output buffer 16 of the FAM. A separate computer, referred to as the data vector memory manager 44, is connected to the memory update port 20, and provides all initial and update data for storing in the data vector memory 12 of the FAM. This configuration allows updating of the data vector memory to proceed concurrently with outputting match results or inputting search parameters.

As FIG. 10b shows, the same host computer 42 may be connected to both ports of the FAM 40. The host computer then performs both computer functions. Details of communication over the two ports 20 and 22 are discussed below with reference to FIG. 11.

Fuzzy Associative Memory Functions:

The FAM system is ideally suited for performing a variety of search functions, four of which are discussed here. These are the general window matching search, the k-nearest neighbor search, the search through windows, and the search to classify by irregular regions.

Figure 3:
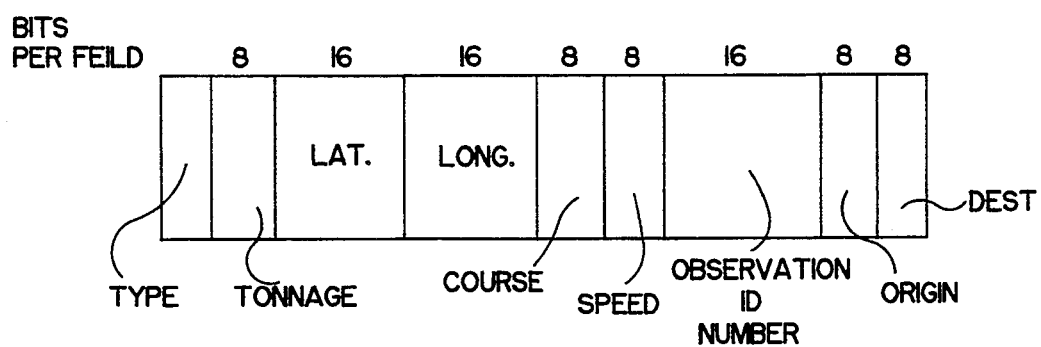
FIG. 3 is a diagram of a sample data vector relating to activities of ships at sea.

General Window Matching Search:

This is the basic function of the FAM system, in which the goal is to identify which of the data vectors satisfy a given set of criteria. For example, suppose that the data vectors were formatted as shown in FIG. 3, to register data pertaining to ships at sea. The data fields include a vessel type code, a tonnage, a latitude, a longitude, a course, a speed, an observation identifier, a port of origin, and a port of destination. A typical window search would be to identify the ships positioned within a specific geographical area, defined by latitude and longitude limits. The limits would be entered into the comparator processor 10 and stored as a comparison window, with only two data fields designated and the remaining ones masked out and ignored. When a selected set of data vectors is then passed through the comparator processor 10, the output buffer 16 accumulates a list of those ships meeting the specified geographical limits.

In this example, only one set of limits is employed. In a more complex search, more comparison windows may be defined, to search in different geographical areas, or to limit the search to specific ship types, or to impose any other desired limitation on the search.

k-Nearest-Neighbor Matching:

The problem addressed by this search function is to locate k closest matches to a given vector X where k is a small integer. In the context of identifying ships at sea, suppose that the vector X represents a new ship observation, and the goal is to find k closest matches to the vector X, in order to determine whether the ship represented by X is the same as one previously sighted. It is assumed that the data vector memory 12 is being continually updated with new information as it comes to hand.

Figures 4, 5:
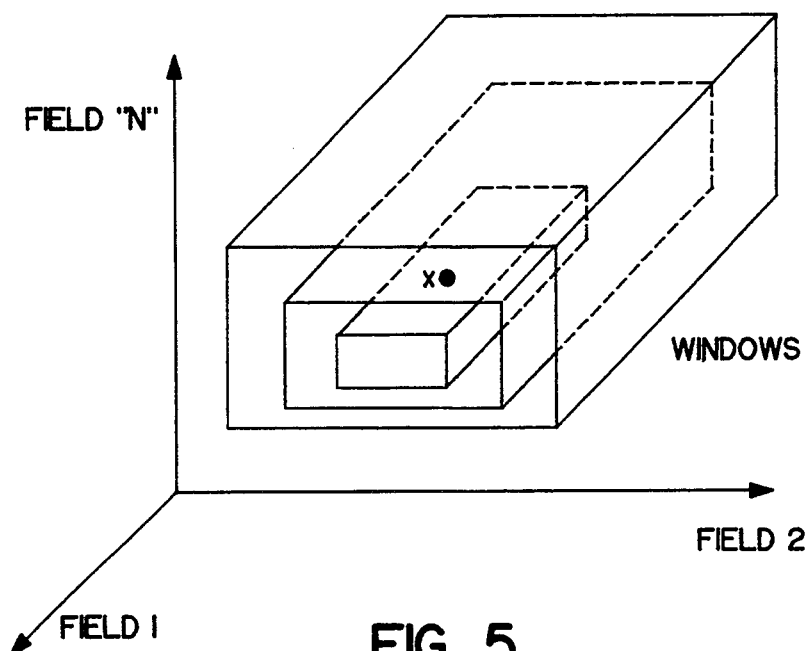
FIG. 4 is a diagram showing how FAM windows might be set up to perform a k-nearest-neighbor search.
FIG. 5 is a diagram representing the windows for a k-nearest-neighbor search in three dimensions.

FIG. 4 shows a vector corresponding to the new observation X, and shows how N windows are set up to include upper and lower limits of increasingly wide tolerance. The uppermost window (#1) is the "tightest" match window, having its upper and lower limits set identically to the same values as in the vector X. Windows #2, #3, and so forth down to #N, have increasingly wider limits for those fields that are not being masked out. FIG. 5 shows this concept graphically for three dimensions. The windows may be thought of as nested rectangular "boxes" of increasing size. The upper and lower limits for the windows are initially selected based on user experience, and the results of the search are analyzed to determine whether any adjustment is required to obtain the desired result. Suppose, for example, that the five nearest matches are required. If more than five matches are found within the first "box," then the limits have to be made smaller, to exclude more data vectors from the first box. If less than five matches are found within the outermost box, then the limits have to be made larger, to include more vectors within the outermost box.

Search Through Windows:

This sub-heading is intended to indicate that the FAM may be used to search through windows rather than through data vectors. This inverse application of the FAM system permits a user to compare a data vector of interest with a very large number of windows, in this case over 65,000 windows.

Figures 6, 7:
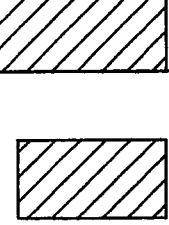
FIG. 6 and 7 are diagrams showing use of the FAM system to search through a large number of windows.

This type of search is best illustrated by another example. FIG. 6 shows some of the N windows with which it is desired to compare an unknown vector X. Suppose there are two observable parameters, such as the frequency and pulse rate in the case of radio-frequency sources. Suppose also that there are thousands of types of sources, indicated by a type code, but that the type code is not observable. The goal is to compare the observed parameters of the unknown vector X with several thousand combinations of parameters, in the form of windows, and hence to classify the unknown source and determine its type code.

Since there are too many windows to store in the comparator processor 10, the approach used is to store the windows in the data vector memory 12 in condensed form, and to perform a k-nearest-neighbor search for the vector X, to determine which of the windows are closest to the unknown vector. The condensed form of the windows includes the average value of each pair of upper and lower limits. The condensed form of each window is representative of its centroid position in n-dimensional space, where n is the number of data fields in the windows.

In the first stage of the search, the thousands of condensed windows in data vector memory are compared with the unknown data vector, and the nearest k window centroids are selected. In the second stage of the search, the selected smaller number of windows in their complete form are used to perform a search to determine which one represents the best classification of the unknown vector. The second step may be more conveniently performed in the host computer 42, since only a small number of windows will be involved, and reloading the FAM system may take longer than performing the second part of the search in the host computer.

Search to Classify by Irregular Regions:

There is a large class of pattern recognition problems for which the FAM system can provide a very powerful tool. Pattern recognition can be considered as a process of matching an n-dimensional vector against a number of n-dimensional regions defining classes into which the vector may fall. For example, in speech recognition one may wish to compare the spectral content of a spoken word with previously stored spectra representing the same word spoken by different people. In this case, each data field of the data vector contains a power level for an incremental frequency band, and all n data fields together represent a power-versus-frequency distribution or histogram. The difficulty with this type of application is that the n-dimensional region representing the spectrum for one person is typically very irregular in shape.

Figure 8:
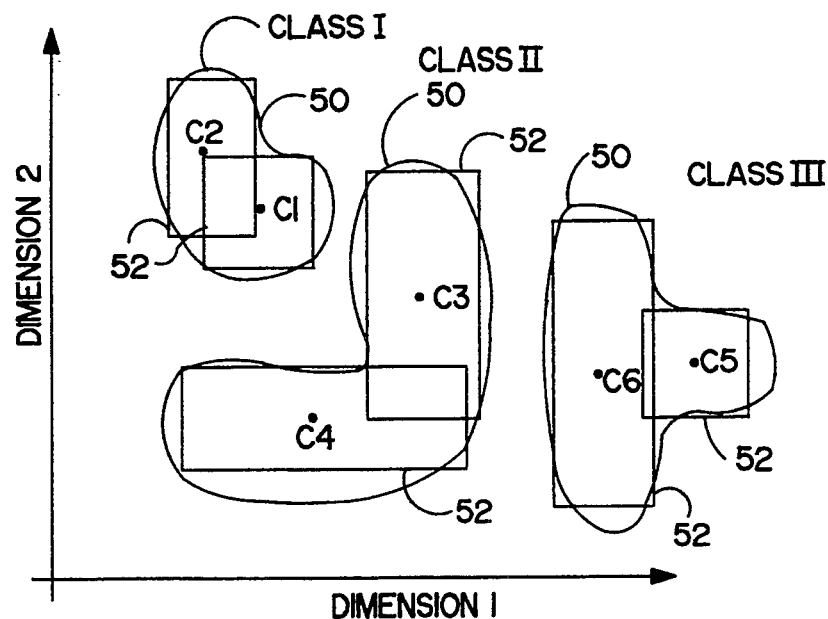
FIG. 8 is a diagram showing, in two dimensions, how irregularly shaped classification regions in a pattern recognition problem may be defined by selections of regular shapes.

This irregularity of shape can best be appreciated in two dimensions, as shown in FIG. 8. The irregular "blobs" indicated at 50 represent different classes into which incoming data vectors are to be sorted or categorized. In the context of speech recognition, it may be that the goal is to determine whether an unknown speaker is one whose speech spectrum for the same spoken word is represented by the blobs 50. It will be understood, of course, that a real problem may involve many more than two dimensions.

Figure 9:
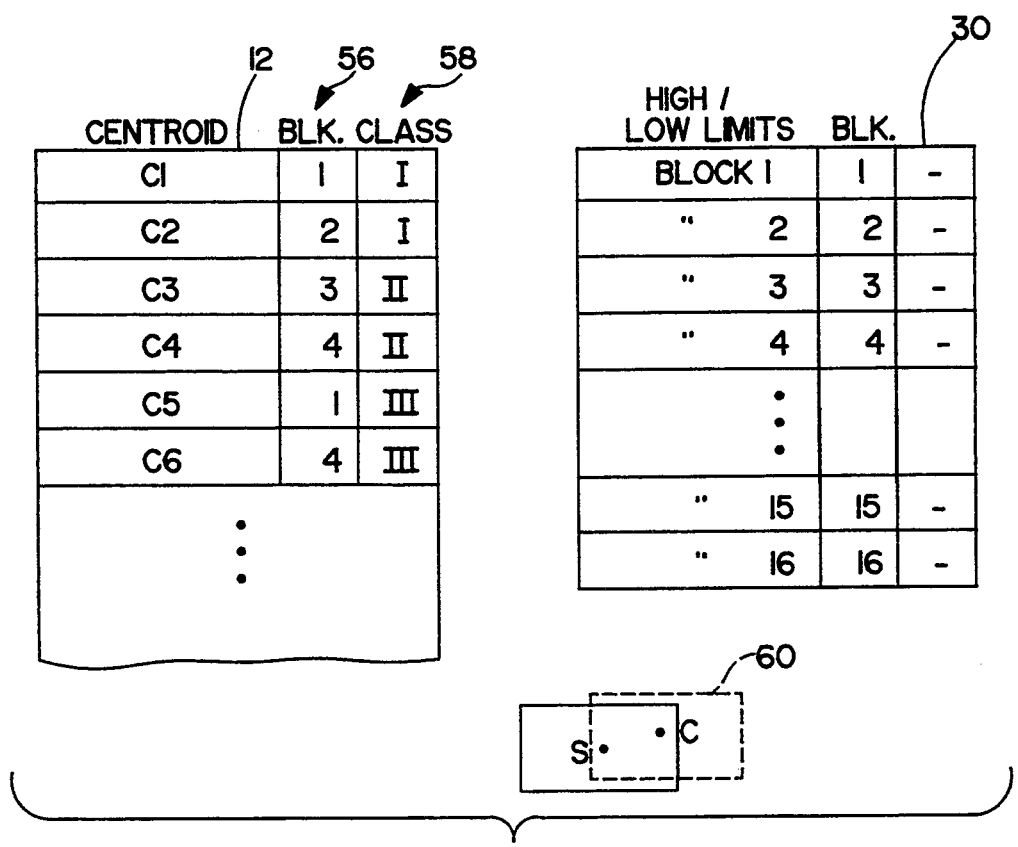
FIG. 9 is a diagram showing the use of the FAM system to classify an unknown vector into one or more classification regions.

Because the blobs 50 are so irregular in shape, and because they are sometimes intertwined and overlapping, conventional windowing techniques in a content addressable memory are unable to make a clear distinction between the classes. The present invention solves this problem by an ingenious use of the data vector memory. The first step in the solution is to approximate each of the irregular blobs 50 as a set of regularly shaped windows, indicated at 52. In the presently preferred embodiment, there is a library of sixteen such regularly shaped windows, each of a different size and shape, which may be thought of as building blocks for the irregular regions. Each building block used to synthesize one of the blobs 50 is stored in one word of the data vector memory 12, and it is stored in condensed form, using only the centroid of the block, appropriately positioned to synthesize a portion of the blob. This is shown in FIG. 9. Two additional fields are used in the data vector. One, indicated at 56, contains the building block number, and the other, at 58, contains the class number being synthesized. The data vector memory is built up in this way until each class of interest is synthesized in approximate form by a combination of the standard regular building blocks.

The comparator processor 10 is then initialized to contain a set of sixteen windows representing the sixteen building blocks. The building block field 56 is also present in these windows, but the class number field 58 is masked out during the comparison process. Another important aspect of the windows is that the windows are all centered on the position of an unknown vector of interest, referred to as S.

When a comparison is made in the FAM system, each component building block of each class will be compared with all sixteen building blocks in the comparator processor 10. For example, if a building block 60, which happens to be a #15 block, is compared with the sixteen blocks in memory, only the #15 block in the processor will be compared, since the block numbers on all the others will not match. (The upper and lower limits in the block number fields of the windows are set to be identical.) Thus, the block 60 will be compared with a block of the same size and shape in the comparator processor 10. A match will be indicated only if the centroid C of the component building block in the data vector memory 12 is within the window defined by the building block centered on the vector S in the comparator processor.

It will be intuitively obvious that, if C falls within the block centered on S, then S would fall within the same block if centered on C, even though the latter comparison has not actually been made. This principle of duality provides a technique by which a single vector S may be compared with literally thousands of windows stored in condensed form in the data vector memory 12. The result words that emerge from the comparator processor 10 will then contain class numbers that may be analyzed to determine the class, if any, into which the unknown vector S falls. As in any pattern recognition problem, the results may be initially ambiguous, indicating more than one class. However, the method provides a pattern classification system that is both rapid and reliable, to the extent that the classes have been accurately and unambiguously defined.

Functional specifications:

As already mentioned, the data vector memory size is 64k (65,536) words of 96 bits each. The internal clock rate is 25 MHz and the technology selected for the data vector memory is static CMOS (complementary metal-oxide-silicon). The comparator processor 10 comprises four VHSIC WAM chips manufactured by TRW, Inc.

The WAM chips, which are described in detail in the cross-referenced application, have an internal clock rate of 25 MHz, but the matching operation requires that the data vectors be clocked in twice. Consequently, for full utilization, new data vectors are required at a rate of 12.5 MHz, or at a rate of one every 80 nanoseconds. This rate made it necessary to use interleaved banks of data vector memory, each of 32k×96 bits.

Figure 12:
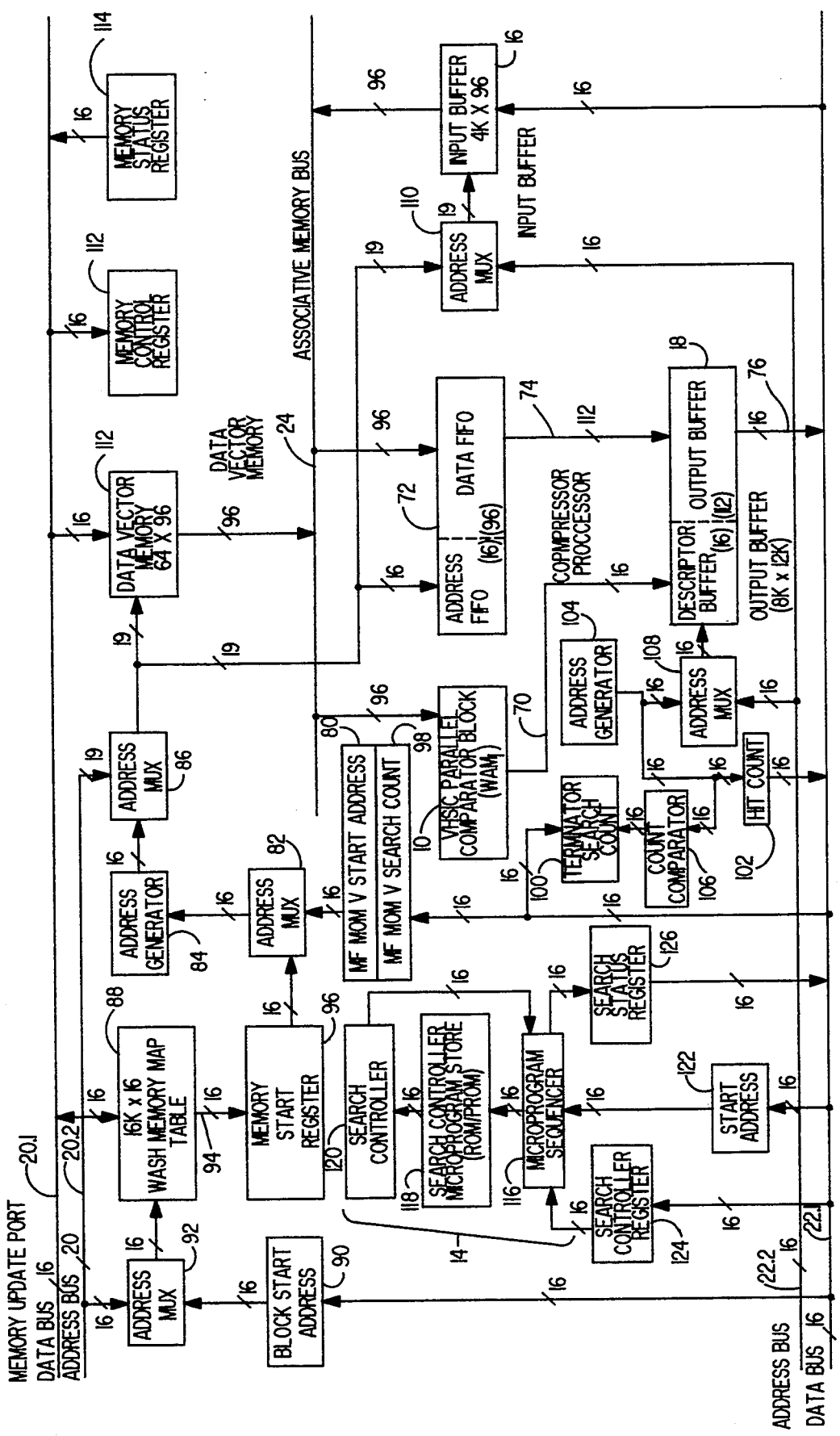
FIG. 12 is detailed block diagram of the FAM system of FIG. 1.

Detailed Block Diagram:

FIG. 12 is a detailed block diagram of the FAM system. FIG. 12 is consistent with FIG. 1 and includes many of the same components, but is expanded to also include control elements and details of how the various components are addressed.

The memory update port 20 is shown as including a data bus 20.1 and an address bus 20.2. Similarly, the search port 22 includes a data bus 22.1 and an address bus 22.2. The principal data paths are as described with reference to FIG. 1. Input data for the comparator, namely the upper and lower limits, are input from the search port data bus 22.1 to the input buffer 16, and from there transmitted to the comparator over the associative memory bus 24. Input data for the data vector memory 12 is carried on the memory data port data bus 20.1. The data vectors are gated into the comparator block 10 one at a time, and compared with the comparison windows, match results appearing on line 70 to the output buffer 18. At the same time, the data vectors and their addresses are gated into a first-in-first-out (FIFO) memory 72, and appear on line 74 to the output buffer 18, in synchronism with the match results on line 70. The output buffer is unloaded over line 76 to the search port data bus 22.1.

Practically all of the remaining components shown in FIG. 12 are concerned with starting, stopping and controlling this comparison process. The data vector memory 12 is a large storage device suitable for storing data vectors relating to more than one search application. In order to perform a search, it is necessary to provide a starting address in the data vector memory 12, and an item count or some other means of terminating the flow of data from the data vector memory. There are two alternatives for specifying a starting address for the data vector memory. The first is for the host computer to specify an absolute memory address on the search port data bus 22.1, which address is stored temporarily in a memory start address register 80. This starting address is transmitted through an address multiplexer 82 and into an address generator 84, which is basically a counter whose value is initialized by the starting address. At the appropriate time, the address in the address generator 84 is transmitted through another address multiplexer 86, and into the address lines of the data vector memory 12.

Since keeping track of multiple blocks of data in the data vector memory is a burden on the host computer, another method is provided for designating the starting address in the data vector memory 12. This makes use of a hash memory map 88, which is basically relates memory block numbers to actual memory addresses. The user, through the host computer, need only then specify a block identifier, which is input over the search port data bus 22.1, and stored temporarily in a block start address register 90. At the appropriate time the block address is gated through another address multiplexer 92, and onto the address lines of the hash memory map table 88. An absolute memory address is output from the table on line 94 to a memory start register 96, which provides a second address input to the address multiplexer 82. The multiplexer 82 chooses between a memory start address provided directly from the search port 22, and one provided indirectly through the hash memory map table 88.

There are three ways in which the comparison searching may be terminated. One is by supplying a memory search count directly from the search port 22, for temporary storage in a memory search count register 98. A second termination approach is to specify a fixed number of match results. This is stored in a terminator search count register 100. The number of matches detected is accumulated in a hit count register 102. The hit count register is controlled by another address generator 104, which is primarily used to generate addresses for the output buffer 18, and is, therefore, indicative of the number of detected matches. The contents of the hit count register 102 and the terminator search count 100 are compared in a count comparator 106, to determine whether searching should be terminated. The third way of terminating counting is upon the detection of a specified pattern in a selected one or more of the sixteen comparison windows in the comparator block 10.

Addressing of the output buffer 18 is effected through another address multiplexer 108, one input of which is derived from the address generator 104, and is used to specify addresses when the output buffer is being loaded with match results. The other input of the multiplexer 108 is derived from the search port address bus 22.2, and is used when the output buffer is being unloaded by the host computer.

Addressing of the input buffer 16 is effected through another address multiplexer 110. One input to this multiplexer is derived directly from the search port address bus 22.2, and is used to specify input buffer addresses when loading the input buffer through the search port 22. The other input of the multiplexer 110 is derived from the output of multiplexer 86, which, in turn, has an input from the address generator 84. This address source for the input buffer 16 is used when unloading the buffer onto the associative memory bus 24 and thence into the comparator block 10.

The data vector memory 12 has associated with it a memory control register 112, the principal purpose of which is to select a mode of operation of the memory, which determines the width of data words supplied to the memory. There is also a memory status register 114, which may be interrogated through the memory update port 20, to determine the status of the memory, and to thereby avoid conflicts for memory usage.

The control logic 14 of the FAM system comprises three principal elements: a microprogram sequencer 116, a search microprogram store 118, and a search controller 120. Basically, the search controller 120 transmits control signals on a plurality of control lines (not shown) to sequence search operations in accordance with the functional description provided earlier in this specification. The search controller 120 is basically an output register to convey control signals to the various components of the system, in accordance with a microprogram stored in the microprogram store 118. Sequencing through the microprogram is in turn controlled by operation of the sequencer 116, which is basically an address generator. A start address for the sequencer 116 is provided by the host computer, through a start address register 122, and this determines the type of search that will be performed. The sequence may be subsequently affected in branching operations, as indicated by the feedback of information from the search controller 120 to the sequencer 116. A search control register 124 effects further control of the sequencer 116, principally to start a search operation, and a search status register 126 provides status information to the host computer, to avoid usage conflicts in relation to the searching process.

The basic function of the control logic 14 is to transfer data within the FAM system at the proper times. The control logic 14 does not manipulate data vectors other than causing them to be transferred internally. The control logic 14 also handles the bus protocol on the search port 22 and the memory update port 20, both of which utilize memory-mapped input-output operations. The search port has priority over the memory update port. During searching, there are no available memory cycles, and the control logic 14 denies access over the memory update bus during the execution of a search.

If a search is requested during memory updating, a search request interrupt is issued to the memory update processor, which must complete its processing as soon as possible. When memory updating is complete, the control logic 14 locks out the memory update port and searching may begin.

The host computer is interrupted when a search is completed. A status register is available from either port to provide the current status of the FAM system. Using memory-mapped input-output, the host computer reads the output buffer directly to obtain the results of the search.

The use of the microprogrammed control logic was selected for greater flexibility and potential for enhancement of the system. In the presently preferred embodiment of the invention, the microprogram sequencer 116 takes the form of an AMD Micro Program Controller, part number AM2910. The search controller microprogram store 118 is a 2k×48-bit programmable read-only memory (PROM), and the search controller is a 48-bit register, which controls up to forty-eight controlled elements. It will be appreciated, however, that other implementations of control logic could have been employed, including hard-wired logic for performing the same functions.

Figure 11:
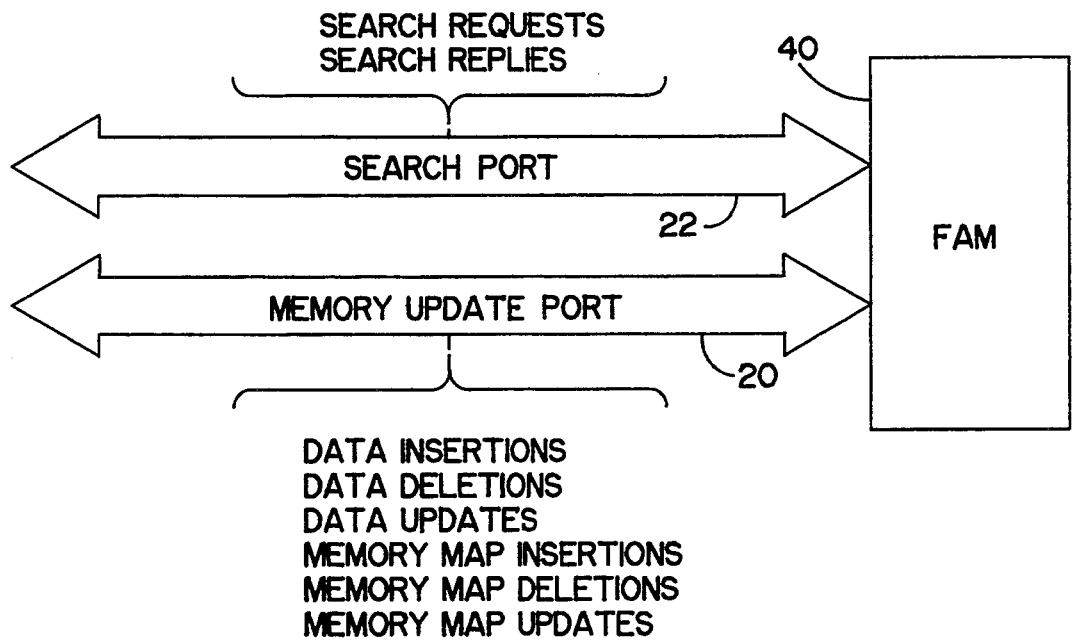
FIG. 11 is a block diagram showing the input/output interfaces for the FAM system.

FAM Interfaces and Protocols:

As indicated in FIG. 11, the FAM 40 divides interface functions between the search port 22 and the memory update port 20. Basically, the search port 22 handles only search requests and search replies, the details of which will be expanded upon below. The memory update port 20 handles data vector insertions, deletions, and updates, and hash memory map insertions, deletions, and updates.

The parameters of a search request are set forth in Table 1 below.

TABLE 1

| | |
|---|---|
| Window bounds | 96 bits per window bound. 16 upper bound - lower bound pairs are required. |
| Field specifier | 24 bits. Specifies which 4-bit nibbles in the data vector words are to be compared by the WAMs. |
| Block start address (optional) | 16 bits. Start address in data vector memory. |
| Block identifier (optional) | 16 bits. Used to determine the start address of subject data vectors in data vector memory. |
| Vector count (optional) | 16 bits. Specifies how many data vectors are to be compared. |
| Match count (optional) | 16 bits. Specifies how many match-vectors are to be accumulated. |
| Window Designator (optional) | 16 bits. Specifies which of the WAM windows are to trigger immediate termination of searching. |
| Microsequence | 16 bits. Specifies which microsequence is to be executed by the FAM. |

Note: Parameters not marked optional are required. Depending on the protocol selected for starting and terminating searching, certain optional parameters are required.

Because the search port interface is memory-mapped, the host computer specifies which parameter is being loaded by the address to which it is written. Each of the parameters in the search request is written to a different address. Of particular interest is the "microsequence" parameter at the end of the table. This is the parameter loaded into the start address register 122, and used to determine the type of search in terms of method of starting and method of terminating the search.

The parameters of a search reply are set forth in Table 2 below.

TABLE 2

| | |
|---|---|
| Number of matches | 16 bits. |

TABLE 2-continued

| | |
|---|---|
| | The number of data vectors in the data vector memory satisfying one or more window matches. |
| Matched data vector | 96 bits. A data vector satisfying one or more window matches. |
| Address of Matched data vector | 16 bits. The address in FAM data vector memory of a data vector satisfying one or more window matches |
| Matching WAM Windows | 16 bits. An n-of-16 bit vector specifying which of 16 WAM windows matched the data word reported out. $1 \leq n \leq 16$. |

The number of matches is obtained from the hit count register 102, and the remaining elements of the search reply are obtained from the output buffer 18.

The functions performed through the memory update port are summarized in Table 3 below.

TABLE 3

| | |
|---|---|
| Command | Read data vector memory<br>Write data vector memory<br>Read hash memory map table<br>Write hash memory map table |
| Address | 16 bits.<br>Address in the specified memory |
| Value | Data vector memory: 96 bits.<br>Hash memory map table: 16 bits.<br>Value to be read or written into the specified memory. |

Performance:

The basic processing rate of the FAM system is 80 ns. per 96-bit data vector comparison. If 4-bit data fields are assumed, this is equivalent to 9.6 billion arithmetic operations per second. In operation, the FAM system functions as an extremely capable peripheral device. It operates completely in parallel with the host computer, which is not encumbered in any way during the searching. Further, the loading of search parameters and the unloading of search results can be "pipelined," that is to say performed with a great degree of concurrency with the searching operation. For most efficient performance, the host computer would read search results from the previous search, and load search parameters for the next search, while performing a current search. In this pipelined method of operation, the "setup time" between searches is very small, being principally the time required to transfer window parameters from the input buffer to the comparator processor. This loading takes place at the internal clock rate. Sixteen WAM windows and associated control words can be transferred in approximately forty internal cycles, or 1.6 microseconds.

For this assumed setup time, the search time in microseconds is given in Table 4 below:

TABLE 4

| Block Size | Search Time (s.) |
|---|---|
| 16 | 2.9 |
| 128 | 11.8 |
| 256 | 22.1 |
| 512 | 42.6 |
| 1024 | 83.5 |
| 2048 | 165 |
| 4096 | 329 |
| 8192 | 657 |
| 32,768 | 2623 |
| 65,536 | 5244 |

As expected, performance is enhanced for large block sizes. By way of comparison, using high-speed conventional processors and assuming 30 microseconds per 96-bit window comparison, a block of sixteen data vectors would be processed in 7.7 ms., 256 vectors in 123 ms., and 1,024 vectors in 492 ms. Thus, for larger blocks of data the FAM system provides an improvement in processing speed measured by a factor of about five thousand eight hundred.

It will be appreciated from the foregoing that the present invention represents a significant advance in the field of content-addressable or associative memories. In particular, the invention provides a fast and extremely convenient tool for the comparison of multiple data vectors with multiple comparison windows, and providing the corresponding match results. The inclusion of a large data vector memory permits the invention to be used for applications that cannot be handled on similar memories available prior to the invention. In particular, the ability to search through thousands of windows for an approximate match, and the ability to classify an unknown vector with respect to multiple irregularly shaped class regions, can be performed easily and quickly in the system of the invention. It will also be appreciated that, although a specific embodiment of the invention has been described in detail for purposes of illustration, various modifications may be made without departing from the spirit and scope of the invention. Accordingly, the invention is not to be limited except as by the appended claims.

We claim:

1. A fuzzy associative memory system, comprising:
    a data vector memory for holding a relatively large number of n-dimensional data vectors;
    window-addressable comparison means, for comparing input vectors with pre-stored sets of upper and lower limits, and generating match results from the comparisons;
    an output buffer, in which match results and corresponding matched data vectors are combined for output;
    input/output means, for accessing the data vector memory, the comparison means, and the output buffer; and
    control means, for directing operations of the window-addressable comparison means, to effect processing of a selected set of data vectors stored in the data vector memory.

2. A fuzzy associative memory system as defined in claim 1, in which the input/output means includes:
    a memory update port for access to the data vector memory; and
    a search port for access to the comparison means and to the output buffer.

3. A fuzzy associative memory system as defined in claim 2, and further comprising:
    first means for starting a search at a data vector memory address specified on the search port; and
    second means for starting a search based instead on a block identifier specified on the search port.

4. A fuzzy associative memory system as defined in claim 3, in which:

the second means for starting a search includes a hash memory table for relating block identifiers with block addresses in the data vector memory.

5. A fuzzy associative memory system as defined in claim 2, and further comprising:
first means for terminating a search, based on a data vector count provided on the search port;
second means for terminating a search, based on a match count provided on the search port; and
third means for terminating a search, based on detection of a preselected data pattern in a preselected comparison window.

6. A fuzzy associative memory system as defined in claim 3, and further comprising:
first means for terminating a search, based on a data vector count provided on the search port;
second means for terminating a search, based on a match count provided on the search port; and
third means for terminating a search, based on detection of a preselected data pattern in a preselected comparison window.

7. A fuzzy associative memory system as defined in claim 1, in which:
the output buffer has two segments to permit unloading of results while a subsequent search is in progress.

8. A fuzzy associative memory system as defined in claim 2, in which:
the output buffer has two segments to permit unloading of results while a subsequent search is in progress.

9. A fuzzy associative memory system, comprising:
a data vector memory for holding a relatively large number of n-dimensional data vectors;
window-addressable comparison means, for comparing input vectors with pre-stored sets of upper and lower limits, and generating match results from the comparisons, each match result including the data vector that matched, the address of the data vector that matched, and an indication of which windows matched;
an output buffer, in which match results are stored for output;
a memory update port for access to the data vector memory, to store data vectors before a search;
an input buffer for holding window data before storing in the comparison means;
a search port for access to the input buffer to load window data, and to the output buffer for unloading search results; and
control means, for directing operations of the window-addressable comparison means, to effect processing of a selected set of data vectors stored in the data vector memory.

10. A fuzzy associative memory system as defined in claim 9, and further comprising:
first means for starting a search at a data vector memory address specified on the search port; and
second means for starting a search based instead on a block identifier specified on the search port.

11. A fuzzy associative memory system as defined in claim 10, in which:
the second means for starting a search includes a hash memory table for relating block identifiers with block addresses in the data vector memory.

12. A fuzzy associative memory system as defined in claim 9, and further comprising:
first means for terminating a search, based on a data vector count provided on the search port;
second means for terminating a search, based on a match count provided on the search port; and
third means for terminating a search, based on detection of a preselected data pattern in a preselected comparison window.

13. A fuzzy associative memory system as defined in claim 10, and further comprising:
first means for terminating a search, based on a data vector count provided on the search port;
second means for terminating a search, based on a match count provided on the search port; and
third means for terminating a search, based on detection of a preselected data pattern in a preselected comparison window.

14. A fuzzy associative memory system as defined in claim 9, in which:
the output buffer has two segments to permit unloading of results while a subsequent search is in progress.

15. A method of performing selectably fuzzy comparisons between a string of data vectors in a data vector memory and a set of comparison windows having upper and lower limits stored in a comparison processor, the method comprising the steps of:
preliminarily storing a plurality of pairs of upper and lower limits of comparison windows in the comparison processor;
preliminarily storing a set of data vectors in a data vector memory, wherein both the data vectors and the comparison windows have n data fields of predefined lengths and meanings;
selecting a set of vectors for comparison from the data vector memory;
comparing each selected data vector with each pair of upper and lower limits;
generating a match condition only when all selected ones of the n data fields within the data vector fall within the upper and lower limits of any of the comparison vectors; and
generating, from the match condition, result words, each indicative of the comparison vector that produced the match and the data vector that produced the match.

16. A method as defined in claim 15, in which:
the step of generating result words provides both the data vector that produced the match and its address in the data vector memory.

17. A method as defined in claim 15, in which:
the step of selecting a set of data vectors includes providing a starting address in the data vector memory.

18. A method as defined in claim 17, in which:
the step of providing a starting address includes deriving the starting address from a data block identifier provided in a search request.

19. A method as defined in claim 15, in which:
the step of selecting a set of data vectors includes terminating searching based on a data vector count.

20. A method as defined in claim 15, in which:
the step of selecting a set of data vectors includes terminating searching based on a match result count.

21. A method as defined in claim 15, in which:
the step of selecting a set of data vectors includes terminating searching based on the detection of a preselected data pattern in a preselected comparison window.

22. A method as defined in claim 16, in which:

the method is to be used to determine which ones of a large number of comparison windows encompass a given data vector of interest;

the step of preliminarily storing data vectors is used to store the centroids of the large number of comparison windows;

the step of preliminarily storing pairs of upper and lower limits is used to store a set of graduated upper and lower limits that define regions of varying proximity to the given data vector of interest;

the step of comparing identifies a small number of the centroids from the many comparison windows, which are the ones closest to the data vector of interest; and the method includes the additional step of determining which of the identified smaller number of comparison windows encompasses the data vector of interest.

23. A method as defined in claim 16, in which:

the method is used to identify a small number of data vectors that are closest to a vector of interest;

the step of preliminarily storing upper and lower limits is used to store a set of nested windows of gradually increasing tolerance centered on the vector of interest; and the comparing step determines which ones of the data vectors lie closest to the vector of interest.

24. A method as defined in claim 16, in which:

the method is used to identify which irregular region a vector of interest lies in;

the method further comprises a preliminary step of defining each irregular region as a combination of regular regions selected from a set of regular regions and placed at selected centroid positions;

the step of preliminarily storing data vectors is used to store centroid positions for each regular region making up part of one of the irregular regions;

the step of preliminarily storing upper and lower limits is used to store windows having upper and lower limits the same as the set of standard regular regions, and each centered at a point corresponding to the vector of interest; and the step of comparing determines which of the irregular regions encompasses the vector of interest.

25. A method for determining into which irregular n-dimensional regions a vector of interest falls, using a data vector memory, and a comparator processor for comparing data vectors with a plurality of comparison windows, the method comprising the steps of:

analyzing each of a plurality of irregularly shaped regions defining n-dimensional classes, to define for each a combination of regular regions that closely approximates the irregular region;

storing in the data vector memory a data vector for each regular region constituting part of an irregular region, the data vector including the centroid of the regular region, together with a type identifier for the regular region and a class identifier for the irregular region;

storing in a window memory a set of upper and lower limits defining the complete set of regular regions available for combining to constitute irregular regions, the window limits being centered on a point corresponding to a vector of interest;

comparing the data vectors with the stored window limits, to determine which of the stored centroids is within the window limits of the regular blocks centered on the vector of interest; and determining, by inference from the comparing step, which of the irregular regions encompasses the vector of interest.

26. A method for comparing a vector of interest with a large number of comparison windows, comprising the steps of:

compressing the windows to a form that does not include window limits, but includes only a centroid position of each window;

storing the compressed form of the windows in a large data vector memory;

storing in a comparison memory a smaller number of windows centered on a point corresponding to a vector of interest; and comparing the compressed windows in the data vector memory with the smaller number of windows centered on the vector of interest, whereby the proximity of the vector of interest to a compressed window is interpreted as also being indicative of a likelihood that the uncompressed window encompasses the vector of interest.

* * * * *